United States Patent Office 3,444,194
Patented May 13, 1969

3,444,194
PROCESS FOR THE PREPARATION OF ADIPIC ACID
Francesco Minisci, Giuseppe Belvedere, Mirella Cecere, and Adolfo Quilico, Milan, Italy, assignors to Montecatini Edison S.p.A., Milan, Italy
No Drawing. Filed Sept. 20, 1963, Ser. No. 311,282
Claims priority, application Italy, Sept. 25, 1962, 19,003/62
Int. Cl. C07c 51/28
U.S. Cl. 260—531        3 Claims Our invention relates to a process for the preparation of adipic acid, which is an intermediate in the production of textile fibers and plasticizers, based on the oxidation of cyclohexane with air and nitrogen oxide.

It is known to oxidize cyclohexane with air. Processes to this effect result in a mixture of cyclohexanone and cyclohexanol which are separated by distillation and further oxidized with nitric acid until adipic acid is obtained.

The known processes are limited in that the oxidation with air in these cases results in low conversions (about 5–10%) because of the formation of side products which greatly diminishes the yield of product, which is to be further oxidized to adipic acid. Furthermore, the solution of cyclohexanone and cyclohexanol in cyclohexane cannot be directly oxidized to adipic acid with nitric acid. It is necessary therefore to separate these air oxidation products and thereafter to treat them with nitric acid. The low conversions obtained in these processes clearly indicate that the separation is an economic millstone.

Processes for obtaining adipic acid by a single step oxidation of cyclohexane with nitrogen oxides are known from copending application Ser. No. 156,501, filed Dec. 1, 1961, now abandoned.

We have now found a process according to which we can reduce the amount of the $N_2O_4$ consumed, by carrying out the oxidation in two steps: the first step with air, and the second with $N_2O_4$, without separating the products of the partial oxidation of the first step.

According to the process which is the object of our invention, the reaction mixture obtained by oxidation of cyclohexane with air, containing preferably from 5 to 10% of cyclohexanol and cyclohexanone, is treated, preferably at a temperature comprised between 30° and 40° C. and in the presence of vanadium salts, preferably ammonium metavanadate or vanadium anhydride with $N_2O_4$ (preferably from 15 to 20% by weight of the mixture); gas is evolved and adipic acid, which is practically insoluble in the reaction mixture, is separated. Cyclohexane containing small amounts of $N_2O_4$ is recycled to the air oxidation step since traces of nitrogen dioxide catalyze the oxidation of cyclohexane with air by remarkably reducing the induction period. The nitrogen oxide, NO, which is present among the gaseous products, is reoxidized by air to $N_2O_4$ and recycled. The oxidation with $N_2O_4$ may also be carried out in the presence of oxygen. For this way, the nitrogen oxide, NO, is oxidized to nitrogen dioxide, making it unnecessary to recover the NO from the gaseous products.

The operation may be carried out under pressure or under atmospheric pressure. In the latter case it is necessary to use a reactor provided with a reflux condenser to avoid the gaseous stream partially carrying off the cyclohexane and the nitrogen oxides, since the reaction is carried out at close to the boiling temperature of the mixture. The reaction is exothermic. A slight cooling with water is sufficient for maintaining the temperature within the desired range of 30–40° C. The adipic acid obtained by this process has a purity of 85 to 96%. The presence of catalysts based on vanadium salts remarkably increases the yields of adipic acid; said yields increase also with the increasing of the ratio cyclohexanol/cyclohexanone in the reaction mixture.

The following examples are reported to illustrate the present invention but they do not limit in any way the modalities of the process as claimed.

Example 1

3.5 g. cyclohexanone, 6.5 g. cyclohexanol and 0.1 g. ammonium metavanadate in 90 g. cyclohexane are mixed with 18 g. $N_2O_4$ in a flask provided with agitator and reflux condenser at room temperature. Gas evolves immediately and the temperature increases. When the temperature is above 35° C., the mixture is cooled with a water bath to maintain the reaction temperature between 30 and 40° C. When, after about 4 hours, the evolvement of gas ceases, the reaction mixture is cooled and the solid product which separates is filtered. Thus, 14.6 g. of a crude product containing 96% adipic acid is obtained. In the gaseous products, 1645 cc. of NO are present under normal conditions; they are rexoidized with air to $N_2O_4$ and are recovered.

Example 2

3.5 g. cyclohexanone, 6.5 g. cyclohexanol and 0.1 g. ammonium metavanadate in 90 g. cyclohexane are reacted with 15 g. $N_2O_4$ as described in the preceding example, but introducing an air stream in the mixture throughout the reaction course. Thus, 14.4 g. of a crude product containing 96.2% adipic acid are obtained.

Example 3

6.5 g. cyclohexanone, 3.5 g. cyclohexanol and 0.1 g. ammonium metavanadate in 90 g. cyclohexane are reacted as described in Example 1, with 18 g. $N_2O_4$. 14.5 g. of a product containing 88.7% of adipic acid are obtained.

Example 4

2.5 g. cyclohexanone, 2.5 g. cyclohexanol and 0.1 g. ammonium metavanadate in 95 g. cyclohexane are mixed in a flask provided with a reflux condenser and agitator, with 9 g. $N_2O_4$. A spontaneous heating and gas evolvement occur. The temperature raises gradually and is kept within the range of 35–40° C., at first by a cold water bath and then by a warm water bath when the evolvement of heat is no longer sufficient to maintain said temperature. When the gas evolvement is stopped, the mixture is cooled and the solid product which separates is filtered. 6.9 g. of crude product containing 93.9% adipic acid are obtained. In the gaseous phase 680 cc. of NO under normal conditions are present, and are oxidized again with air to $N_2O_4$ and are then recovered.

Example 5

The reaction has been carried out as described in Example 4, but sending to the reaction mixture and oxygen stream and using 7.7 g. instead of 9 g. of $N_2O_4$. 6.75 g. of the crude product containing 93.4% adipic acid were obtained.

Example 6

3.5 g. cyclohexanone, 6.5 g. cyclohexanol and 0.1 g. vanadium anhydride in 90 g. cyclohexane are reacted with 15 g. $N_2O_4$. By external cooling, the temperature of the exothermic reaction is maintained between 30° and 40° C. After 5 hours, the mixture is cooled and the solid product which separates is filtered. Thus, 14.1 g. of product are obtained; the chromatographic analysis in the vapor phase of the esterified product shows the presence of 95.7% adipic acid.

We claim:
1. A process for the preparation of adipic acid by oxidation of cyclohexanol and cyclohexanone, which com- prises reacting a cyclohexane solution, containing 5 to 10% of a mixture of cyclohexanol and cyclohexanone, with $N_2O_4$ in the presence of vanadium salts at a temperature between 30 and 40° C.

2. A process for the preparation of adipic acid by oxidation of cyclohexanol and cyclohexanone, which comprises reacting a cyclohexane solution, containing 5 to 10% of a mixture of cyclohexanol and cyclohexanone, with 15 to 20% by weight of reaction mixture of $N_2O_4$, in the presence of vanadium salts at a temperature between 30 and 40° C.

3. A process for the preparation of adipic acid by oxidation of cyclohexanol and cyclohexanone, which comprises reacting a cyclohexane solution, containing 5 to 10% of a mixture of cyclohexanol and cyclohexanone, with 15 to 20% by weight of reaction mixture of $N_2O_4$, in the presecence of air and a compound selected from the group consisting of ammonium metavanadate and vanadium anhydride at a temperature between 30 and 40° C.

References Cited

UNITED STATES PATENTS

| | | | |
|---|---|---|---|
| 2,298,387 | 10/1942 | Kenyon et al. | 260—537 |
| 2,844,626 | 7/1958 | Kamlet | 260—531 |

FOREIGN PATENTS

| | | |
|---|---|---|
| 376,506 | 6/1962 | Japan. |

LORRAINE A. WEINBERGER, *Primary Examiner.*

V. GARNER, *Assistant Examiner.*

U.S. Cl. X.R.

260—533